United States Patent [19]
Ellis

[11] Patent Number: 4,487,424
[45] Date of Patent: Dec. 11, 1984

[54] BICYCLE SPROCKET SHIELD

[76] Inventor: William L. Ellis, 21030 Reserve Dr., Fairview Park, Ohio 44126

[21] Appl. No.: 459,716

[22] Filed: Jan. 21, 1983

[51] Int. Cl.³ .............................................. B62K 13/00
[52] U.S. Cl. ................... 280/289 G; 74/609; 474/144
[58] Field of Search ............ 280/259, 289 G; 74/609; 474/144

[56] References Cited
U.S. PATENT DOCUMENTS
504,121  8/1893  Cheesman ........................... 474/144
675,502  6/1901  Thomas ................................ 74/609

FOREIGN PATENT DOCUMENTS
2479766 10/1981 France ................. 474/144
314599   7/1934  Italy ..................... 74/609
444088   3/1936  United Kingdom .................. 74/609

Primary Examiner—John A. Pekar

[57] ABSTRACT

A universal flexible sprocket shield adapted for pedal crank attachment by any user of single, three speed, or ten to fifteen speed bicycle. A modified shield is adapted for original equipment installation as a flexible shield extension to existing sprocket plates.

15 Claims, 8 Drawing Figures

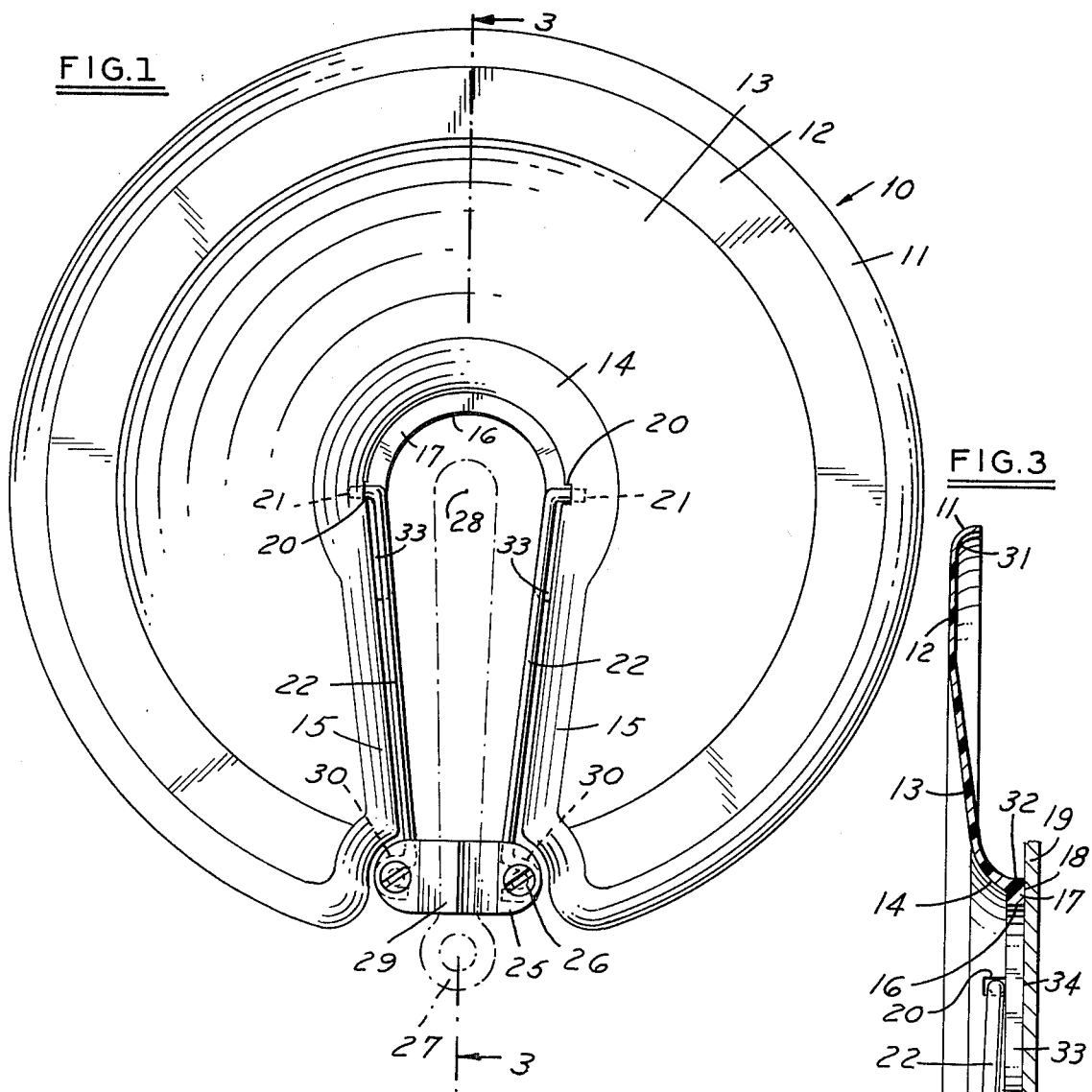
FIG.1
FIG.3
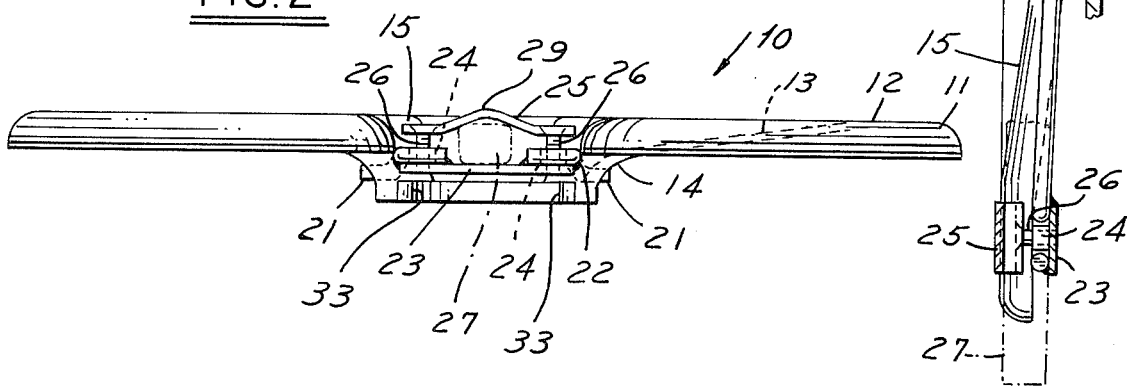
FIG.2

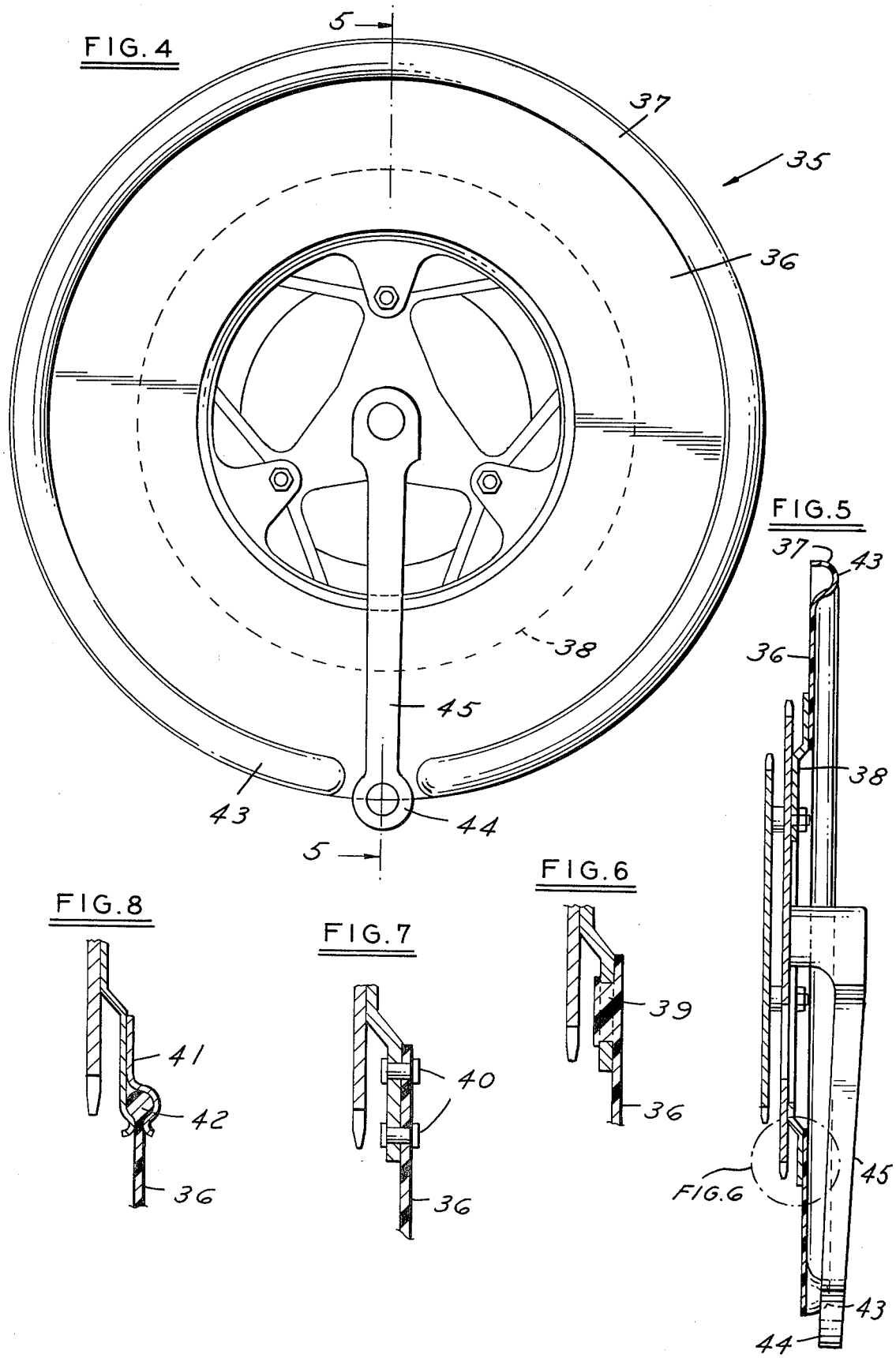

4,487,424

BICYCLE SPROCKET SHIELD

BACKGROUND OF THE INVENTION

Conventional chain guards cover only the top of the chain and do not protect trouser leg material, shoelaces and other clothing or barefeet from picking up grease stains or becoming caught in the mechanism throughout the 360° rotation of the chain sprocket. Conventional chain guards do not cover the derailer, a particular hazard-prone device on multi-speed systems. Early prior art patented sprocket shields such as disclosed in U.S. Pat. Nos. 504,121, 675,502, and 1,136,411 are rigid and not universally applicable to all types of sprockets. A later U.S. Pat. No. 3,477,303 discloses a two sprocket assembly having an annular chain guard formed as a rigid stamping adapted for non-universal original equipment installation and U.S. Pat. No. 3,815,439 likewise discloses rigid stamped chain guard members for original equipment manufacture which are not universally applicable or flexible.

SUMMARY OF THE PRESENT INVENTION

The present invention is primarily directed to provide a universal flexible sprocket shield adapted to provide a pant leg guard against material coming in contact with the lubricated parts of the pedal-sprocket-chain driving mechanism and from becoming caught in the chain drive or derailer on multi-speed systems. Two sizes of plastic discs are provided for pedal crank lengths from 4½" to 7" which includes all bicycles currently manufactured. A rounded edge on the outer perimeter of the disc tends to roll away shoe laces and pant leg material from the sprocket chain and derailer area and also serves as a strengthening provision at the perimeter of the disc compatible with flexural modulus required for proper disc function.

Resiliency of the plastic disc permits shock absorption without permanent denting or distortion and with no possibility of discomfort to the rider. A universal clamp is provided for pedal crank attachment near the pedal with projecting spring rods adapted to engage the shield disc on either side of a central opening resiliently urging the center of the disc into engagement with the outer face of the sprocket. A radially extending shield slot in alignment with the pedal crank has a rolled down edge adapted to provide a smooth deflector for pant leg material, shoe laces or other user garment.

BRIEF DESCRIPTION OF THE DRAWINGS

FIG. 1 is a face view of a preferred embodiment of the sprocket shield adapted for user installation;

FIG. 2 is an end view of the shield shown in FIG. 1;

FIG. 3 is a sectional view taken along the line 3—3 of FIG. 1;

FIG. 4 is a face view of a modified construction adapted for original equipment installation;

FIG. 5 is a sectional view taken along the line 5—5 of FIG. 4;

FIG. 6 is a detailed view of the encircled area of FIG. 5 showing one method of attachment to sprocket cover;

FIG. 7 is a view similar to FIG. 6 showing an alternative method of attachment;

FIG. 8 is a view similar to FIG. 6 showing another alternative method of attachment.

DETAILED DESCRIPTION OF THE DRAWINGS

With reference to FIG. 1 the main body of the shield assembly comprises molded plastic annular disc 10 having rolled radius outer perimeter 11, planar ring portion 12 and inwardly tapered wall portion 13. Inwardly radiused horseshoe collar 14 with pedal crank spanning extensions 15 has radiused center opening 16 at the inside of semi-circular annulus 17 having inner face 18 adapted for engagement of sprocket 19. Slot apertures 20 provided on either side of arcuate portion 14 accommodate insertion of angled ends 21 of springs rods 22 outward ends of which are secured as by welding to inner plate 23 provided with threaded attachment lugs 24 for securing outer attachment plate 25 with screws 26 to clamp the shield assembly on pedal crank 27 at a position where center 28 of opening 16 coincides with the center of sprocket 19. Center 29 of top plate 25 is provided with a radiused channel adapted to align clamp plates 23, 25 relative to pedal crank 27 and spring rods 22 are formed with a wider free angle than the installed configuration illustrated in FIG. 1 so as to bias ends 21 into outward engagement with slot apertures 20; and rods 22 are additionally formed with an inward bend causing free ends 21 to extend substantially inward of their installed position shown in FIG. 3 so as to create a preloaded retention of annulus face 18 against sprocket 19 securely holding disc shield 10 in planar alignment with the sprocket 19 without further means of attachment.

Two sizes of discs 10 are contemplated for pedal crank lengths from 4½" to 7" which includes all bicycles currently in production. Rounded edge 11 of the disc perimeter tends to roll away any contacting shoe laces and pant leg material from the sprocket-chain derailer area. It also provides stabilizing of relatively thin molded plastic wall 31 compatible with the flexural modulus required for proper disc function. Larger size disc of 13" diameter may be applied to bicycles having a pedal crank length of 6" to 7" while a smaller 10" diameter size disc may be applied to pedal crank lengths from 4½" to 5½". Both are applicable to single and multi-speed bikes; also to those having one-piece oval shaped pedal cranks, or three-piece rectangular shaped cranks. On both small and large size discs a 1 ⅛" inside radius for opening 16 and 1½" radius 32 for sprocket engagement annulus 17 are critical dimensions in achieving universal application of the shield to existing bicycle sprockets. A random survey indicates that such dimensions enable about 99.2% bicycles in use to be equipped with one of the two alternative sizes.

The pedal stud of conventional bicycle pedals extends beyond the outer face of the pedal crank approximately ¼" to ½" in order to prevent the protruding side of the riders ankle bone from striking the pedal crank. Outside finished surface of applicant's shield is even with or slightly inside of the outer face of the pedal crank thereby precluding the possibility of having the disc interfere in any way with the cyclist pedaling the bike. Disc 10 is preferably constructed of a resilient somewhat flexible plastic material, examples of which are hereafter specified, such as to absorb any shock of bumping without cracking or permanent deflection. A clear plastic material is preferred as aesthetically compatible and complementary to bicycles of any color.

Projecting from semi-circular annulus 17 linear extensions 34 of sprocket engaging surface 18 of approximately 1⅜" are critical in the design of the ¼" thick attachment face 17 in order to accommodate sprockets having three 120° spoke divisions or five 72° segments and in order to provide a maximum sprocket face engagement as a suitable bearing surface precluding the possibility of disc tipping relative to the sprocket. The inward radius of the horseshoe extensions 15 in the disc provides a smooth roll-off edge for pant leg material, shoe laces, etc. to avoid catching in the opening.

Assembly of disc 10 to wire rods 22 is accomplished by simply springing ends 21 inwardly and releasing them to engage apertures 20; and assembly of the shield to any bicycle pedal crank is accomplished by merely placing clamp plates 23, 25 over pedal crank 27, inserting and taking up clamp clearance with screws 26, sliding the clamp to a centering position of disc 10 relative to sprocket 19 and tightening the screws to securely retain the assembled position.

With reference to FIG. 4 modified sprocket shield 35 constructed for original equipment installation comprises a flexible ring annulus 36 having radiused perimeter 37 adapted for attachment as an extension to conventional sprocket cover 38 as by molded protrusions 39 illustrated in FIG. 6, rivets 40 as illustrated in FIG. 7 or by clamp 41 applied to inner molded bead 42 as illustrated in FIG. 8.

Here, as in the first embodiment, outermost surface 43 of shield extension 35 lies within outermost surface 44 of pedal crank 45 so as to avoid any ankle interference with the rider and will be understood to equally shield pant leg and shoe lace from any contact with sprocket chain or derailer.

In providing an extension shield of substantial diameter such as 13" of the larger size, flexibility of the material is critical due to the possibility of chance engagement in riding up or down over an exceptionally high curb or from otherwise contacting obstacles which could permanently bend or damage any metal or nonflexible shield. Considerable search for a satisfactory material has lead to either a buterate such as "Uvex" manufactured by Eastman or an ionomer resin such as "Surlyn" manufactured by DuPont. Either of these provides an almost optically clear product which will not deplasticize under weathering or long ultra-violet exposure. Tests in Arizona, Tennessee and Florida—over extended sun exposure times—have assured a three to five year life. In addition neither will lose its resilience or become opaque due to discoloration.

The OEM disc may be manufactured in opaque colors in harmony with the multi-colored bikes and produced at a much lower cost than clear plastic. While the drawings show several options for fastening the flexible plastic ring to the sprocket chain cover plate, there are, of course, other alternatives and it may well be practical to make the entire "plate" and extending shield of plastic eliminating the need for assembly fasteners.

I claim:

1. Bicycle sprocket shield comprising annular disc having radial pedal crank clearance slot extending from central opening, mounting flange means around said opening, pedal crank arm engaging clamp means, and means extending from said clamp means for holding said disc in coaxial shield relation to a bicycle sprocket assembly.

2. Bicycle sprocket shield as set forth in claim 1 including spring bias means for holding said disc against an external surface of said bicycle sprocket assembly.

3. Bicycle sprocket shield as set forth in claim 2 wherein said spring bias means comprises a pair of rods extending from said clamp means to said flange means on either side of said central opening.

4. Bicycle sprocket shield as set forth in claim 1 wherein said flange means includes a substantially semi-circular flange with linear extensions on either side of said radial slot.

5. Bicycle sprocket shield as set forth in claim 1 wherein said clamp means comprises transverse plates adapted to extend over inner and outer surfaces of a pedal crank, at least one of said plates including a recess adapted to extend longitudinally of said crank to position said clamp in square transverse relationship on any oval or rectangular form of said pedal crank.

6. Bicycle sprocket shield as set forth in claim 1 wherein the outer perimeter of said disc includes an inward curvature adapted to smoothly divert any contacting portion of the riders apparel.

7. Bicycle sprocket shield as set forth in claim 1 wherein the edge of said slot is provided with an inward curvature adapted to smoothly divert any contacting portion of the rider's apparel.

8. Bicycle sprocket shield as set forth in claim 1 wherein said flange means has a substantially semi-circular inner radius of approximately 1⅛".

9. Bicycle sprocket shield as set forth in claim 8 wherein said flange means has an outer radius of approximately 1¼".

10. Bicycle sprocket shield as set forth in claim 8 wherein said flange means has an outer radius of approximately 1½" and linear extensions of approximately 1⅝".

11. Bicycle sprocket as set forth in claim 1 wherein said disc has an outer perimeter of approximately 13" diameter.

12. Bicycle sprocket as set forth in claim 1 wherein said disc has an outer perimeter of approximately 10".

13. Bicycle sprocket shield as set forth in claim 1 wherein the outermost surface of said shield extends within the surface of revolution of the outermost surface of said crank.

14. Bicycle sprocket shield as set forth in claim 13 wherein the outermost surface of said shield extends outside of the innermost surface of revolution of said crank.

15. Bicycle sprocket shield as set forth in any of claims 1–14 wherein said annular disc comprises resilient flexible material capable of substantial deflection with full recovery.

* * * * *